(No Model.) 2 Sheets—Sheet 1.

W. B. McCANN.
ICE CREAM FREEZER.

No. 542,596. Patented July 9, 1895.

Witnesses:

Inventor:
William B. McCann
by Henry Connett
his Attorney (No Model.) 2 Sheets—Sheet 2.

W. B. McCANN.
ICE CREAM FREEZER.

No. 542,596. Patented July 9, 1895.

Witnesses:
J. W. Kliman
Peter A. Ross

Inventor:
William B. McCann
by Henry Connett
his Attorney

UNITED STATES PATENT OFFICE.

WILLIAM B. McCANN, OF PHILADELPHIA, PENNSYLVANIA.

ICE-CREAM FREEZER.

SPECIFICATION forming part of Letters Patent No. 542,596, dated July 9, 1895.

Application filed February 24, 1893. Renewed September 18, 1894. Serial No. 523,347. (No model.)

*To all whom it may concern:*

Be it known that I, WILLIAM B. MCCANN, a citizen of the United States, residing in Philadelphia, Pennsylvania, formerly of the city, county, and State of New York, have invented certain new and useful Improvements in Ice-Cream Freezers, of which the following is a specification.

My invention relates to freezers for cream, sherbets, &c.; and the object is to produce a simple and effective machine adapted to do its work rapidly and with very little labor.

In the accompanying drawings I have illustrated a freezer embodying my invention.

Figure 1:
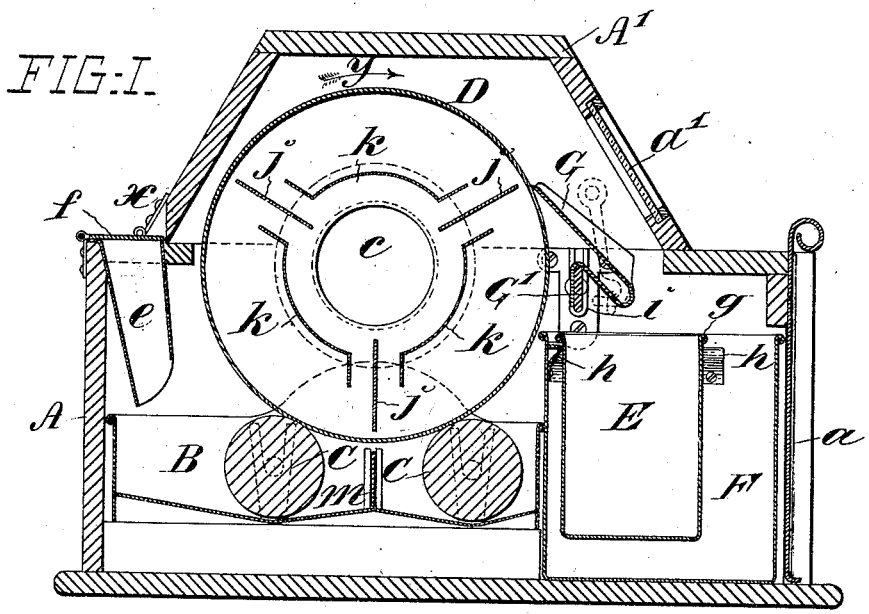
Figure 2:
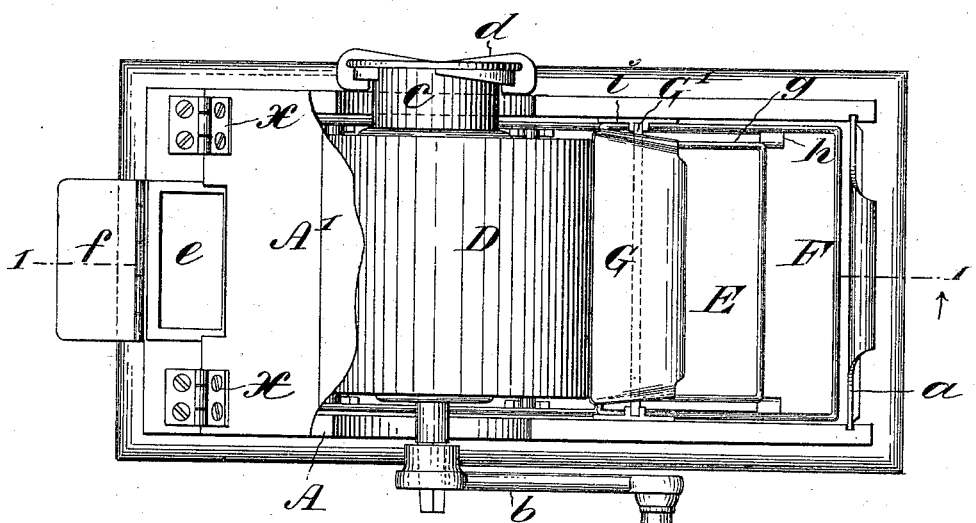
Figure 3:
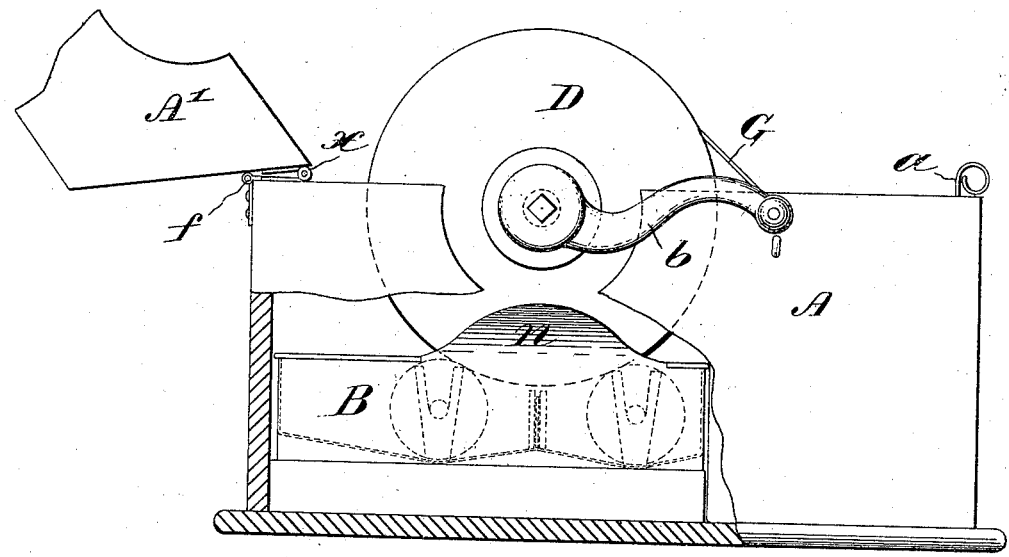
Figure 4:
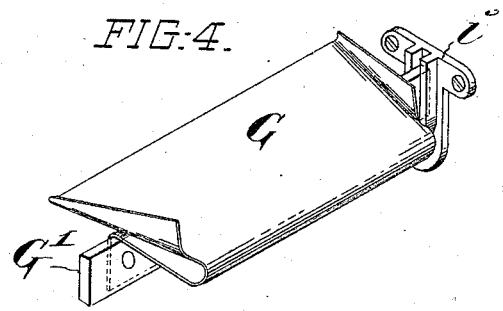
Figure 5:
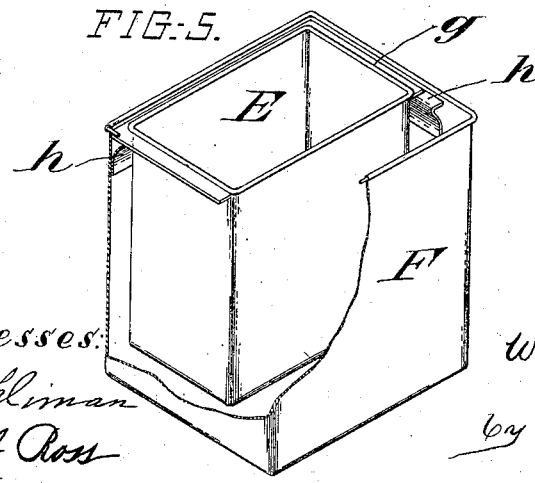

Figure 1 is a vertical section of the freezer in substantially the plane indicated by the line 1 1 in Fig. 2. Fig. 2 is a plan of the same with a part of the outer inclosing-box and its cover broken away. Fig. 3 is a side elevation of the same with the cover raised and a part of the side of the inclosing-box broken away. Fig. 4 is a perspective view of the scraper detached, and Fig. 5 is a perspective view of the receiving and packing vessel detached and partly broken away.

Within a suitable inclosing-box A is placed a cream-pan or receptacle B to contain the liquid to be frozen, and in this pan are mounted transfer or feed rollers C, spaced or set at a little distance apart, the journals of which rest in bearings on the sides of the pan. The rollers C are of sufficient diameter to extend above the level of the cream in the pan B. This level cannot exceed that of the partition $m$, hereinafter described. Therefore, as shown in Fig. 1, the cylinder D does not dip into the cream at all, but receives its supply of cream from the two rollers C individually, being thus twice charged in each rotation. These rollers may be lifted out for cleaning, and they may be made from any suitable material. I prefer to make them of wood or of some other material which does not yield up its specific heat readily.

On the feed-rollers C rests a drum or cylinder D to contain the refrigerating mixture, which will usually be ice and salt. This cylinder will be, by preference, made of sheet metal and have cast metal ends or heads and it will have no bearings in the box at all. At one end the cylinder is provided with a crank $b$ for turning it and at the other end it has an inlet $c$ for charging it with the refrigerating mixture. This inlet has a removable cover or cap $d$, which is herein shown as provided with a fastening similar to that employed on fruit-jars. Any suitable fastening may be employed to secure the cap $d$ in place, but removably.

The box A has a part of its top hinged at $x$ to form a cover A', which may be turned back on its hinges, as seen in Fig. 3. In the fixed part of the cover of the box is an aperture, on the margin of which is suspended a spout $e$ for introducing the cream or other liquid to be frozen to the pan B. This pan or receptacle, as shown in Figs. 1 and 3, is a double pan having its partition or middle wall $m$ lower than the others and constituting, of course, one of the sides of each receptacle or compartment of said double pan. This aperture is closed by a hinged cover $f$.

At the opposite end of the box is situated the mold or receiver E for the frozen cream. This mold is suspended in a vessel F, adapted to contain a refrigerant for packing the cream in the receiver or mold E. The vessel F is simply set or pushed into the box A when a door or slide $a$ therein has been removed, and the receiver E is suspended in the vessel F by its margin $g$, taking over cleats $h$ on the said vessel. The mold or receiver may, of course, be lifted out of the vessel F.

G is the scraper, which will be formed of sheet metal, by preference, as it should be elastic or springy and press elastically against the periphery of the cylinder D. The scraper is bent to a U shape and its lower branch is secured rigidly, by riveting or otherwise, to a bar G', the extremities of which drop into and are held by keepers $i$ secured to the inner faces of the sides of the box A, as clearly shown. This scraper may be readily removed for cleaning by simply lifting the bar G' out of its keepers.

The operation of the freezer is simple. Cream or other liquid substance to be frozen is poured into the pan B, and the cylinder D, previously charged with the freezing mixture, is rotated in the direction of the arrow $y$ in Fig. 1. The cream is fed to the cylinder by the roller C, at the right in Fig. 1. This cream instantly freezes in a film on the periphery of the cylinder, and when this film reaches the roller at the left by the rotation of the cylinder this latter roller applies another film on top of that already frozen. The scraper G scrapes the frozen cream from the cylinder and it falls into the mold E. The operation is continuous after the first revolution of the cylinder and will continue until all the liquid in the pan has been taken up and fed to the cylinder.

By employing feed-rollers C, as shown, I obtain a double feed, which forms a very thick frozen film on the cylinder and insures against uncovered spaces being left on the surface of the cylinder, as would be apt to occur if a single feed were employed. Moreover the double feed, by doubling the thickness of the film, practically doubles the yield over a single feed without adding notably to the power required to rotate the cylinder, as the latter is solely carried by and supported by the rollers, and therefore there are no shaft-bearings to produce friction. The rollers are so spaced that the cylinder rests on and between them in such a manner as to afford a firm and stable rolling-support.

In order to keep the refrigerating mixture in the cylinder agitated and up to or adjacent to the periphery of the cylinder at the upper side of the same as it rotates, the latter is provided interiorly with plates extending across it from end to end. These are clearly shown in the transverse section, Fig. 1. The plates $j$, preferably three or more, equally spaced, extend radially, or substantially so, and serve mainly as agitators to stir and lift up the refrigerating mixture while the cylinder rotates, and the plates $k$, which will have by preference somewhat the form of trays, are arranged between adjacent plates $j$ and between the axis and periphery of the cylinder. The plate $k$ will extend at substantially right angles to the radius of the cylinder at the point where the middle of the plate intersects it. These plates $k$ serve to support and uphold the refrigerating mixture above the axis of the cylinder, thus keeping it adjacent to the periphery of the latter.

The double pan shown in Figs 1 and 3 may be used for freezing two different kinds of cream and applying them to the cylinder at each revolution. The partition $m$, constituting in effect an end wall or side for each pan, of course determines the height to which the liquid may rise without intermingling the two kinds, which would be very undesirable. Thus one roller will feed one kind of liquid to the cylinder and the other roller will lay a film of the other kind on the first film frozen. The partition $m$ may be removable, its ends being fitted snugly and closely in keepers on the sides of the pan, or it may be fixed in the pan. Where it is not desired to freeze two kinds of cream a pan without a partition may be employed, or the same kind of liquid may be placed in both compartments of the partitioned pan.

The cover A' has set in it a plate of glass $a'$ over the scraper, so that the operation of the machine may be conveniently noted without removing or turning back the cover.

In order to prevent endwise movement of the cylinder on the feed-rollers, which may occur when the freezer is operated by an inexperienced person, end stops of some kind will be provided, either on the sides of the inclosing-box or on the sides of the cream-pan. I have shown such stops $n$ formed on the sides of the pan B by extending said sides upward, as shown. Some form of limiting end stops for this purpose is rendered the more necessary, as there are no bearings at the cylinder-axis.

I find that a single feed for the cylinder applies such a thin film of frozen cream thereon that the scraper must press upon the cylinder with considerable force in order to take under and remove such film, and this is apt to cause the scraper to remove particles of the soft metal coating from the cylinder, which mingle with the cream; but where two or more films are applied and frozen, one superposed on the other, a thick layer is formed, which may be removed without difficulty. Indeed, if desired, the scraper may be so set as to remove the major portion of the frozen cream and still leave a thin coating film on the cylinder, thus avoiding all danger of scraping off particles of metal.

As the cylinder has no axial bearings the inclosing-box is not necessary to the operation of the freezer. It is employed mainly for the sake of cleanliness and to prevent the absorption of heat from the surrounding air. In Fig. 6 I have shown a construction wherein the inclosing-box is dispensed with, the cream-pan being placed on a base $A^2$ furnished with uprights $a^2$ to support the scraper G.

It will be noted that the feed-rollers C are so placed that a plane passing vertically through the axis of the cylinder and longitudinally thereof will pass between said rollers, whereby the rollers are in peripheral contact with the cylinder at opposite sides of the lowest point of its periphery and not directly beneath its axis. This imparts stability to the rotating cylinder and dispenses with the necessity of axial bearings therefor. The rollers are driven from the cylinder solely by peripheral contact therewith.

The scraper should be removed before the cylinder is lifted off from the feed-rollers and replaced after the cylinder is again in position.

Two short cream-pans, in lieu of one long one with a partition, may be employed.

One important feature of my invention is the facility with which the freezer may be adapted to the use of either right or left handed people by merely turning the cylinder D around, end for end. This is due to the fact that there are no axial bearings for the cylinder and to the fact that the internal devices $j$ and $k$ are symmetrical—that is to say, they will perform their functions properly in whichever way the cylinder is rotated.

Having thus described my invention, I claim—

1. In a freezer for ice cream and the like, a cylinder to contain the refrigerant provided interiorly with means for agitating and upholding the refrigerant during the rotation of the cylinder, said means comprising the plates $j$, arranged substantially radial to the cylinder and the tray-like plates $k$, between the plates $j$, and arranged substantially as set forth.

2. In a freezer for ice-cream and the like, the combination with the cylinder for the refrigerant and means for feeding to the periphery thereof the liquid to be frozen, of the sides which support the scraper, the recessed keepers $i$, fixed to said sides, the bar G', adapted to rest removably in said keepers, and the scraper, of sheet metal bent into a U-shape and its lower branch secured rigidly to the bar G' at its front end, whereby the scraper is supported wholly by the said bar, as set forth.

3. In a freezer of the character described, the combination with the cylinder for the refrigerant, a scraper to remove the cream therefrom, and two feed-rollers arranged respectively, on opposite sides of a vertical plane passing longitudinally through the axis of the cylinder, of a cream pan in which said rollers are mounted, said pan having a partition between said rollers, as set forth.

In witness whereof I have hereunto signed my name in the presence of two subscribing witnesses.

WILLIAM B. McCANN.

Witnesses:
PETER A. ROSS,
JAS. KING DUFFY.